United States Patent [19]

Sasaki

[11] Patent Number: 4,685,881

[45] Date of Patent: Aug. 11, 1987

[54] NOZZLE ASSEMBLY FOR INJECTION MOLDING

[75] Inventor: Nobuyoshi Sasaki, Yokohama, Japan

[73] Assignee: M.C.L. Co., Ltd., Japan

[21] Appl. No.: 692,105

[22] Filed: Jan. 17, 1985

Related U.S. Application Data

[63] Continuation of Ser. No. 603,114, Apr. 23, 1984, Pat. No. 4,601,870.

[30] Foreign Application Priority Data

Apr. 27, 1983 [JP] Japan .................................. 58-72975
Apr. 27, 1983 [JP] Japan .................................. 58-72976

[51] Int. Cl.[4] ............................................. B29C 45/22
[52] U.S. Cl. ..................................... 425/562; 264/524;
264/572; 264/328.1; 264/328.8; 425/564;
425/588
[58] Field of Search ............... 264/513, 524, 537, 572,
264/328.1, 328.8; 425/190, 535, 536, 547, 549,
573, 577, 584, 572, 588, 564, 562

[56] References Cited

U.S. PATENT DOCUMENTS 4,106,887 8/1978 Yasuike et al. ...................... 425/535
4,403,933 9/1983 Davis et al. .......................... 425/572

Primary Examiner—Jay H. Woo
Assistant Examiner—Timothy W. Heitbrink
Attorney, Agent, or Firm—Laff, Whitesel, Conte & Saret

[57] ABSTRACT

An injection nozzle assembly is used for molding a plurality of articles having accurate dimensions without causing a sink mark to appear in the molded article. The injection nozzle assembly comprises a body which is heated to a temperature higher than the melting point of thermoplastic material. A cylindrical bore is formed within the body, and an outlet port is formed at one end of said cylindrical bore. A plunger moves within the cylindrical bore between a first position near the outlet port to a second position which is remote from the outlet port. A first feed line supplies the molten thermoplastic material and a second feed line feeds high pressure through passageways that are formed within the body. The plunger is formed within a first passageway connecting the feed line with the outlet port when the plunger is moved to the second position. The pressure at the outlet port is reduced by the movement of the plunger from the first position to the second position.

1 Claim, 3 Drawing Figures

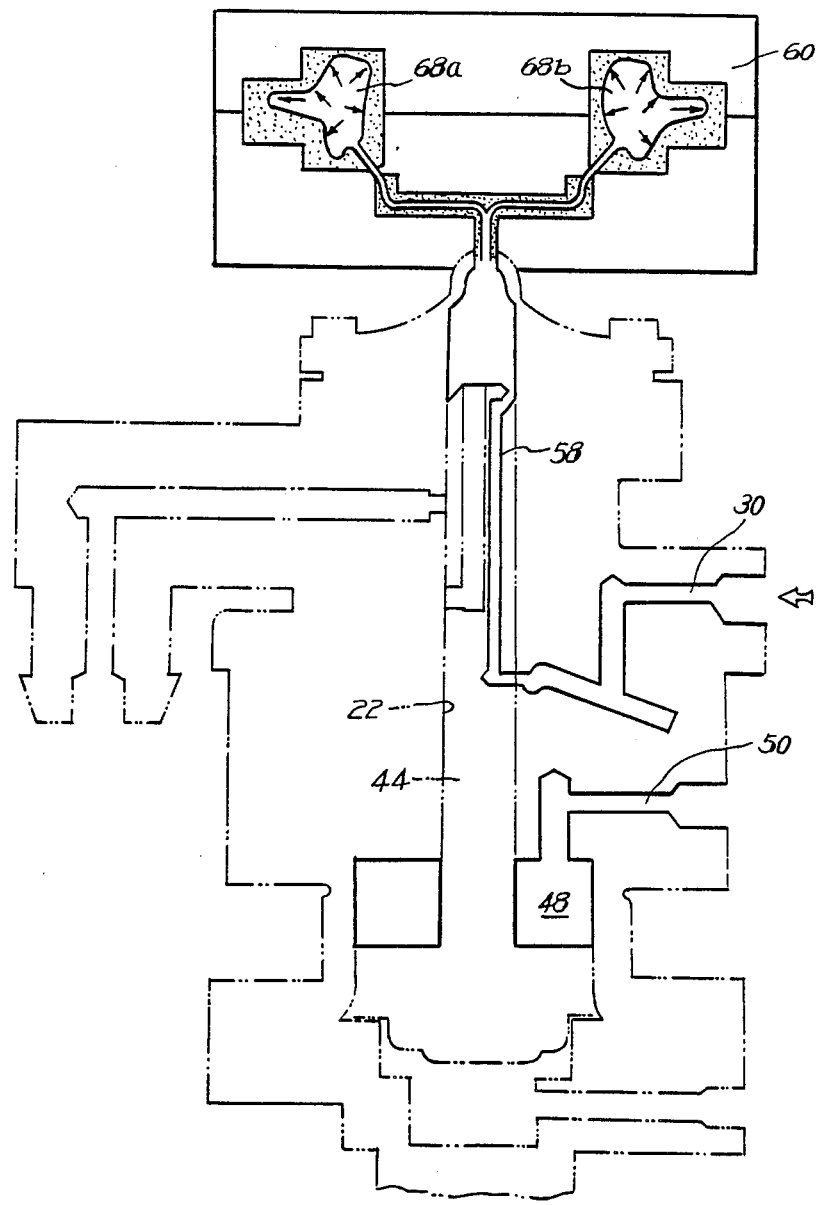

NOZZLE ASSEMBLY FOR INJECTION MOLDING

This is a continuation of application Ser. No. 06/603,114, Filed Apr. 23, 1984, now U.S. Pat. No. 4,601,870.

BACKGROUND OF THE INVENTION

1. Field of Art

The present invention relates to an apparatus for molding lost wax masters used in the investment casting or for molding articles of thermoplastic material through the injection molding. More particularly, it relates to an injection molding an apparatus for molding articles having hollow core portions.

2. Prior Art

Injection molding processes have been widely used not only for the production of molded articles made of various thermoplastic resins but also for the production of lost wax masters (hereinafter referred to as wax models) used in the investment casting process. Since the molded products, such as wax masters, tend to shrink during the cooling step in or after the injection molding process, each molding cavity has the dimensions slightly larger than those of the finished product molded therein. However, due to this shrinkage resulted by cooling, the surface of the wax mold or molded product is often caved to suffer so-called "sink mark" particularly when the molded product is relatively thick and has large surface area or areas. The dimensional stability of the finished product is seriously affected by the formation of "sink mark" to make it difficult to mold the wax model having accurate dimensions.

In conventional injection molding processes, the wall thickness of the wax or other thermoplastic materials is decreased as thin as possible by embedding an inlay made of another thermoplastic material or by incorporating a core within the mold cavity. However, these known methods are disadvantageous in that the producibilities thereof are poor and hence they are not suited for mass production.

In order to eliminate the need of embedding an inlay or core made of another material, an improved process has been proposed wherein a molten thermoplastic material is injected in each mold cavity and then high pressure air is fed in each mold cavity to back up the mass of plastic material during the cooling step to prevent shrinkage of molded article due to cooling. The specification of Japanese Patent Application No. 123944/1974 discloses a nozzle assembly suited for this purpose. However, the nozzle assembly disclosed by the preceding patent application is not fully satisfactory in that the volume of air flown into the mold cavity is too small since air is fed into the mold cavity previously filled with a pressurized thermoplastic material, and in that the air supply passage is frequently blocked by the cooled and solidified thermoplastic material. It is, therefore, required to increase the air pressure to a very high level in order to feed sufficient volume of air in each mold cavity.

OBJECTS AND SUMMARY OF THE INVENTION

An object of this invention is to provide an injection nozzle assembly for molding a wax model or a molded article of other thermoplastic material without the fear of formation of sink mark.

Another object of this invention is to provide an injection nozzle assembly for molding a wax model or product article having accurate dimensions.

A further object of this invention is to provide an injection nozzle assembly suited for mass production of molded article having hollow core portion.

A still further object of this invention is to provide a nozzle assembly used in the aforementioned process.

In order to attain the aforementioned objects, the present invention provides a nozzle assembly used for injecting a molten thermoplastic material, the nozzle assembly having a passageway for supplying a molten thermoplastic material and a separate passageway for feeding high pressure air. By the use of the nozzle assembly of the invention, the pressure in the mold cavity is once reduced after the molten thermoplastic material is injected into the mold cavity and then the mold cavity is communicated with the high pressure air feed passageway. More specifically, the nozzle assembly for injecting a molten thermoplastic material, according to the invention, comprises a body heated to a temperature higher than the melting point of the thermoplastic material and having a cylindrical bore communicated with an injection port of a mold, the body being formed with a first feed line for supplying the molten thermoplastic material and a separate second feed line for feeding high pressure air, and a plunger movable within said cylindrical bore from a first position to a second position, the plunger being formed with a first passageway for passing the molten thermoplastic material and a separate second passageway for passing high pressure air, said first feed line being communicated with said first passageway when the plunger is moved to said first position and said second feed line being communicated with said second passageway when the plunger is moved to said second position.

DESCRIPTION OF THE DRAWINGS

The present invention will be fully understood from the following description with reference to the appended drawings, in which:

FIG. 3 is a schematic illustration showing the step of feeding high pressure air into hollow core portions of the mold cavities.

DESCRIPTION OF PREFERRED EMBODIMENT

Figure 1:
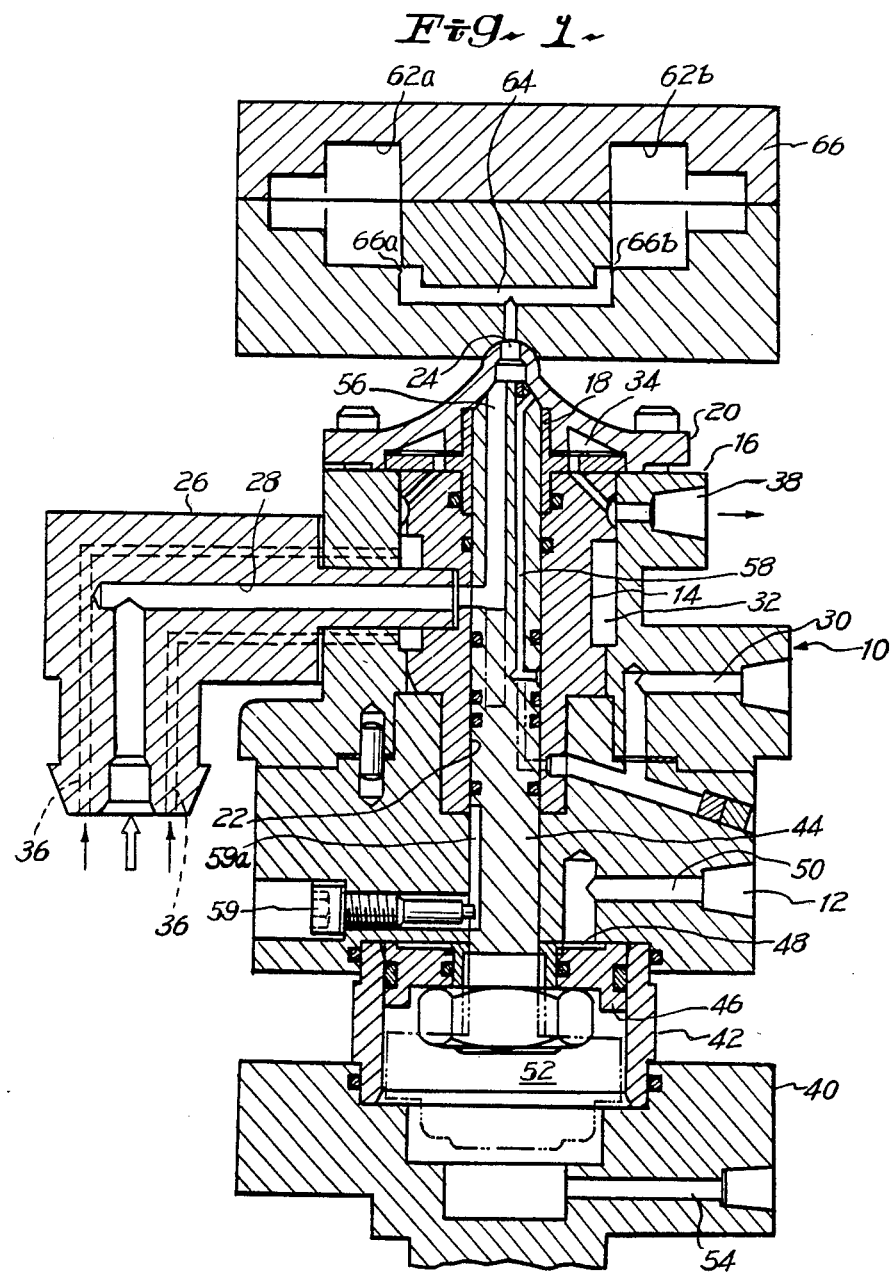
FIG. 1 is a sectional view showing an embodiment of the nozzle assembly according to the invention.

Initially referring to FIG. 1, the construction of the nozzle assembly of the invention will be described.

The nozzle assembly has a body, generally denoted by reference numeral 10, which includes a casing 12, a bearing 14, a housing 16, a bushing 18 and a nozzle cover 20. A hollow cylindrical bore 22 extends in the longitudinal direction of the body through the bearing 14 and the casing 12. The upper opening of the cylindrical bore 22 is communicated with an outlet port 24 formed at the substantial center of the nozzle cover 20. The diameter of the outlet port 24 is smaller than that of the cylindrical bore 22. A fitting 26 having a general section of letter L is attached to the housing 16, and has a first feed line 28 for supplying molten thermoplastic material, such as molten wax. The first feed line 28 extends through the housing 16 and the bearing 14 to open to the cylindrical bore 22. On the other hand, a second feed line 30 for feeding high pressure air is formed through the bearing 16 to open to the cylindrical bore 22.

A warm water passage 32 is formed between the housing 16 and the bearing 14, and another warm water passage 34 is formed between the bushing 18 and the nozzle cover 20. Warm water supplied under pressure through a plurality of warm water supply passages 36 surrounding the first feed line 28 of the generally L-shaped fitting 26 flows through the warm water passages 32 and 34 to be discharged from a warm water discharge port 38. The discharged warm water is again heated by a not-shown heater to be recirculated through the passages 36, 32 and 34, so that the portions of the body through which the molten wax flows are heated to a temperature higher than the melting point of the wax.

A cylinder 42 is interposed between the lower face of the casing 12 and a base plate 40.

Reference numeral 44 designates a plunger slidingly inserted in the cylindrical bore 22 and having the lower end connected to a piston 46 which is slidingly moved in the cylinder 42. An upper chamber 48 is defined by the interior wall of the cylinder 42 and the upper face of the piston 46, and a lower chamber 52 is defined by the interior wall of the cylinder 42 and the lower face of the piston 46. The upper chamber 48 is communicated with a conduit 50, and the lower chamber 52 is communicated with another conduit 54. The piston 46 and the plunger 44 are lowered to the position shown by the phantom line in FIG. 1 as actuating air is fed through the conduit 50 to the upper chamber 52, and the piston 46 and the plunger 44 are raised to the position shown by the solid line in FIG. 1 as actuating air is fed through the conduit 54 to the lower chamber 52.

The plunger 44 is formed with a first passageway 56 for passing therethrough the molten wax and a separate second passageway 58 for passing therethrough high pressure air. The first passageway 56 is communicated with the first feed line 28 to pass the molten wax to the outlet port 24 as the plunger 44 is raised to the first position as shown in FIGS. 1 and 2. At the time when the plunger 44 is held in the first position, the second passageway 58 is disconnected from the second feed line 30 to be sealingly closed by the interior wall defining the cylindrical bore 22. The upper opening of the second passageway 58 is closed by a ledge provided on the inside face of the nozzle cover 20 for this purpose. As the plunger 44 is lowered to the second position as shown in FIG. 3, the first passageway 56 is disconnected from the first feed line 28 and the second passageway 58 is communicated with the second feed line 30 for feeding high pressure air. Reference numeral 59 in FIG. 1 designates a guide pin having one end loosely inserted in an elongated groove 59a formed along the longitudinal direction of the plunger 44 to prevent the plunger 44 from rotation.

Reference numeral 60 designates a splittable mold having two mold cavities 62a and 62b which are connected with each other by a sprue runner 64 communicating with the outlet port 24 of the nozzle assembly. The mold cavities 62a and 62b are communicated with the sprue runner 64 through throttled inlet or injection ports 66a and 66b, respectively. The mold 60 is assembled with the body 10 so that the sprue runner 64 communicates with the outlet port 24 of the nozzle assembly. Cooling water is circulated through a cooling water passage (not shown) formed through the mold 60 to cool the mold 60 below the melting temperature of the wax or other thermoplastic material.

The operation of the nozzle assembly according to the present invention will now be described with reference to FIGS. 2 and 3. As the plunger 44 is raised to the first position, i.e. the position shown in FIG. 2, by supplying actuating air through the conduit 54, the upper and lower end openings of the second passageway 58 is closed within the cylindrical bore 22. The molten wax is supplied under pressure from the first feed line 28 to be passed through the first wax passageway 56, the outlet port 24 and the sprue runner 64, and injected through the throttled injection ports 66a and 66b into the mold cavities 62a and 62b. As passing through the throttled injection ports 66a and 66b, the flow speed of the molten wax is significantly increased to generate turbulent flow. Since the mold 60 is cooled to a temperature lower than the solidification temperature of the wax, the wax adhering on the walls defining each mold cavity is immediately solidified. As the molten wax is injected in each mold cavity while forming a turbulent flow flowing at a very high speed, solidification of wax propagates from the portions contacting to the wall defining the mold cavity toward the core portion so that a shell-like solidified mass of uniform thickness is formed while leaving the wax at the vicinity of hollow core portion 68 in a yet fluidized condition.

At the time when the volume of the injected wax reaches the pre-set level, for example about one third to two third ($\frac{1}{3}$ to $\frac{2}{3}$) of the volume of each mold cavity 62, the actuating air supply through the conduit 54 is shut off and actuating air is supplied through the conduit to the lower chamber 52 by changing the connection by means of an electromagnetic valve (not shown), whereby the plunger 44 begins to move downward. During the downward stroke of the plunger 44, the first wax passageway 56 is disconnected from the first feed line 28 so that wax supply to the cavities 62 is stopped. As the plunger 44 is lowered further, while both of the first and second passageways 56 and 58 are held in the shut-off condition, the pressure in the sprue runner 64 and the hollow core portions 68 is dropped correspondingly. When the plunger is lowered to the second position, i.e. the position shown in FIG. 3, the second passageway 58 is communicated with the second feed line 30 for feeding high pressure air, whereupon pressurized air flows through the sprue runner 64 and the injection ports 66 into the hollow core portions 68 surrounded by the solidified wax shell.

In the conventional process, the wax contained in the sprue runner 64 is initially solidified to limit or even block the flow of high pressure air. However, in the process of the invention wherein the aforementioned nozzle assembly is used, the pressure in the hollow core portions 68 is gradually dropped as the plunger 44 moves downward so that the pressure difference between the pressure in the second feed line 30 and the pressure in the hollow core portions 68 reaches the maximum level. As a result, at a moment when the sprue runner 64 is communicated with the second feed line 30 through the second passageway 58, a large amount of pressurized air flows into the sprue runner 64 vigorously at a relatively increased rate to ensure formation of narrow flow passage for high pressure air throughout the yet fluidized mass of molten wax contained in the sprue runner 64 and the throttled injection ports 66. Sufficient back-up air pressure is, thus, developed within the hollow core portions 68 since a sufficient amount of high pressure air is fed through the second feed line 30 and the second passageway 58 into the hollow core portions 68.

The wax shell in each mold cavity 62 is completely solidified while applying high back up pressure from the hollow core portion 68. Wax models having accurate dimensions can be prepared efficiently without the fear of formation of sink mark. The mold 60 is then splitted and the molded wax masters are removed therefrom. Since the hollow core portion 68 of each molded product communicates with the atmosphere through the flow passage through with the high pressure back up air has flown, the pressure in the hollow core portion 68 is equal to the atmospheric pressure after the molded product is removed from the mold 60. Accordingly, there is no risk that the molded wax master is broken or otherwise adversely affected by cooling.

The invention will now be illustrated with reference to the following example.

EXAMPLE

Figure 2:
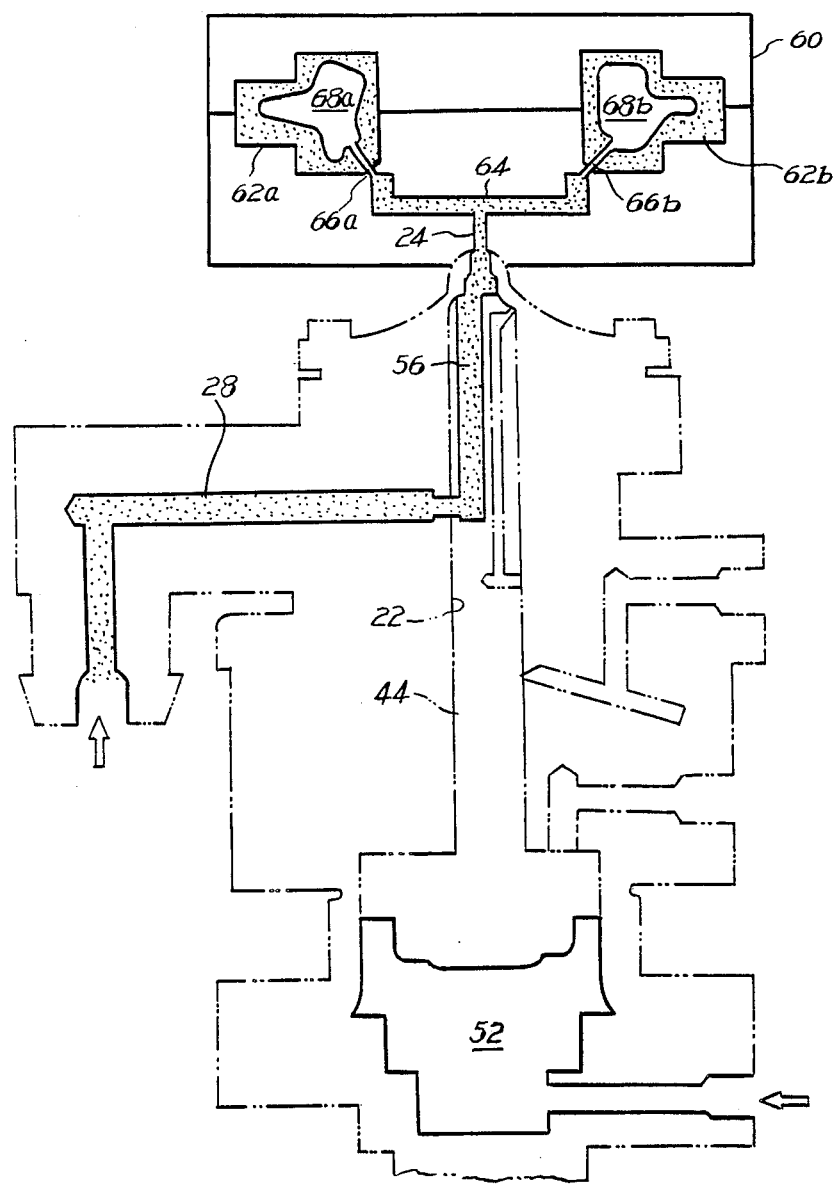
FIG. 2 is a schematic illustration showing the step of injecting the molten thermoplastic material into the molds.

Using the nozzle assembly shown in FIGS. 1 to 3, a montan wax model having a volume of about 21.4 cm$^3$ (including the volume of hollow core portion) was prepared in accordance with the process of the invention. The volume of hollow core portion was pre-set to occupy about one tenth to one fifth (1/10 to 1/5) of the total volume of the finished product. The diameter of the throttled injection port 66 was about 1.0 mm.

The plunger 44 is raised to the first position, the position shown in FIGS. 1 and 2, and molten montan wax was injected in a mold cavity at an injection rate of about 7.14 cm$^3$/sec for about 3 seconds. The temperature distribution throughout the flow passage for the montan wax was within the range of 68° to 75° C., and the mold was continuously cooled by recirculating cold water.

The injection speed of the wax flowing through the throttled injection port 66 was calculated to be about 900 cm$^3$/sec.

After the completion of injection, the plunger 44 is lowered to the second position, the position shown in FIG. 3, and high pressure air was fed through the second feed line 30 and the second passageway 58 into the half-solidified mass of montan wax. The pressure of air was 6.00 kg/cm$^2$, and the pressure of air was maintained at that level until the wax in the mold cavity was completely solidified, followed by removal of molded product.

The molded products prepared by repeated operation cycles were satisfactory in that they had accurate dimensions and were free of sink mark or similar defect.

Although the invention has been described with reference to a preferred embodiment wherein wax models used for lost wax casting are prepared, the nozzle assembly according to the invention may be used for the production of molded articles from any thermoplastic resins, such as polystyrene or polyethylene.

Although the throttled injection port 66 is positioned at the bottom corner of each cavity in the illustrated embodiment since the molten wax once falling down to the bottom portion of the mold cavity may be again sprayed upward by the incoming flow of molten wax to facilitate formation of a shell having more uniform wall thickness, it should be appreciated that the objects of the invention may be attained by changing the position of the throttled injection port 66.

Likewise, in the illustrated embodiment, a relatively small volume of molten wax is injected into each mold cavity 62 to form a relatively large hollow core portion 68. The consumption of wax can be, thus, decreased to have an additional cost-saving effect. However, without departing from the broad concept of the invention, each mold cavity may be filled completely with the molten material, followed by feeding of high pressure air for developing high back up pressure within the hollow core portion spontaneously formed by shrinkage due to cooling.

What is claimed is:

1. A nozzle assembly for injecting a molten thermoplastic material through a sprue runner and into a plurality of mold cavities, said sprue runner and plurality of cavities being formed within a single mold, said assembly comprising a body which is heated to a temperature which is higher than the melting point of said thermoplastic material, a cylindrical bore in said body communicating through a single outlet port formed at one end of said cylindrical bore to at least two mold cavities, the body being formed with a first feed line for supplying the molten thermoplastic material and a separate second feed line for feeding high pressure air, plunger means slidably mounted within said cylindrical bore and being movable from a first position near said single outlet port to a second position remote from said single outlet port, the plunger being formed with a first passageway for passing the molten thermoplastic material and a separate second passageway for passing the high pressure air, and said first feed line communicating with said first passageway when said plunger is moved to said first position and said second feed line communicating with said second passageway when said plunger is moved to said second position, the pressure in said single outlet port being reduced when said plunger is moved from said first position to said second position.

* * * * *